United States Patent
Skujins, Jr.

3,786,674
Jan. 22, 1974

[54] COAXIAL MAGNETOSTRICTIVE ACCELEROMETER

[75] Inventor: Romans Skujins, Jr., Clifton, Va.

[73] Assignee: The United States of America as represented by the Secretary of the Army, Washington, D.C.

[22] Filed: Sept. 6, 1972

[21] Appl. No.: 286,804

[52] U.S. Cl. .............................. 73/71.4, 73/517 R
[51] Int. Cl.... G01h 1/00, G01p 15/00, G08b 13/00
[58] Field of Search........ 73/71.2, 71.4, 510, 517 R; 340/261, 7 R, 9, 11; 310/26

[56] References Cited
UNITED STATES PATENTS

| | | | |
|---|---|---|---|
| 2,826,706 | 3/1958 | Sackett | 310/26 |
| 3,703,681 | 11/1972 | Johnson et al. | 73/517 R X |
| 3,335,401 | 8/1967 | Kerns | 340/7 R |
| 3,689,875 | 9/1972 | Kostelnicek | 340/261 X |
| 3,045,491 | 7/1962 | Hart | 73/517 R UX |

*Primary Examiner*—James J. Gill
*Attorney, Agent, or Firm*—Edward J. Kelly; Herbert Berl; Glenn S. Ovrevik

[57] ABSTRACT

A coaxial magnetostrictive accelerometer designed to sense mechanical vibration or acceleration and convert these vibrations or accelerations to a corresponding electrical signal is disclosed. A single accelerometer designed in accordance with this invention may be used to sense vibrations and accelerations or a very large number of accelerometers of this invention may be connected in series by sections of coaxial cable and used with single channel electronic sensing and measuring devices.

2 Claims, 2 Drawing Figures

PATENTED JAN 22 1974 3,786,674

COAXIAL MAGNETOSTRICTIVE ACCELEROMETER

The invention described herein may be manufactured, used, and licensed by or for the Government for Governmental purposes without the payment to me of any royalties thereon.

BACKGROUND OF THE INVENTION

This invention relates to accelerometers; and more particularly, to a coaxial magnetostrictive accelerometer.

Many different types of accelerometers designed to sense mechanical vibrations or accelerations are known in the art. These prior art devices range from purely mechanical to electromechanical to sophisticated electronic devices. In some of these prior art devices, the mechanical vibrations or accelerations are converted into corresponding electrical signals which are then measured or detected by electrical sensing equipment. Generally speaking, with this type of prior art device, the use of more than one accelerometer requires the use of multi-channel electronic sensing and measuring gear. Each accelerometer normally has its own channel.

The accelerometer of this invention is simple to construct, is inexpensive and can generally be used anywhere where vibrations or accelerations are to be measured. Further, a very large number of the accelerometers constructed in accordance with this invention can be connected in series by sections of coaxial cable and used with single channel electronic sensing and measuring equipment. This feature permits multi-point vibration or acceleration sensing with but single channel electronic measuring and sensing equipment.

The accelerometer of this invention can be used anywhere where vibrations or accelerations are to be sensed. More specifically, the accelerometer can be used as an alarm to measure excessive vibrations in plant machinery, as an alarm to detect vehicle theft, as an alarm to detect the breaking-in or dismantling of mechanical equipment, as an alarm to detect forcible entry through metallic doors, windows and into safes and storage cabinets, to detect the cutting of metallic fences and in any other similar and diverse applications where vibrations or accelerations are to be sensed.

SUMMARY OF THE INVENTION

The coaxial magnetostrictive accelerometer of this invention comprises a coil wound around a ferrite core. A separator is placed around the coil and then a coaxial shield is placed around the separator. The shield is then covered with a protective covering.

The coaxial shield is placed around the coil in accordance with the formula $C = L/Z^2$, so that the coil follows the laws of a slow transmission line having a characteristic impedance $Z$, unit inductance $L$, and unit capacitance $C$, so that $Z = \sqrt{L/C}$.

A very large number (as many as a hundred or more) of the coaxial magnetostrictive accelerometers of this invention can be connected in series without appreciable attenuation of the magnetostrictive signals induced in one of the coaxial magnetostrictive accelerometers provided that coaxial cable is used to connect the accelerometers in series and that the impedance of the coaxial cable so used equals the impedance of the coaxial magnetostrictive accelerometer. In other words, the coaxial cable used to interconnect the accelerometers must be matched impedance wise with the accelerometers. This feature of the invention enables multi-point vibration or acceleration sensing with single channel sensing and measuring circuitry. In addition, an array of the coaxial magnetostrictive accelerometers may contain accelerometers of different sensitivity to suit the acceleration criteria of that point. Such an array is especially suited in alarm applications where it is desired to monitor vibrations of many points inexpensively.

It is therefore an object of this invention to provide an accelerometer.

It is another object of this invention to provide a coaxial magnetostrictive accelerometer.

It is still another object of this invention to provide an array of accelerometers that can be used with single channel electronic sensing and measuring circuitry.

It is a further object of this invention to provide a series array of coaxial magnetostrictive accelerometers that can be utilized with single channel electronic sensing and measuring circuitry.

It is still a further object of this invention to provide a series array of coaxial magnetostrictive accelerometers which may contain coaxial magnetostrictive accelerometers of different sensitivities.

BRIEF DESCRIPTION OF THE DRAWING

The above mentioned and other object will become readily apparent from the following detailed description of the invention when read in conjunction with the annexed drawing in which.

DESCRIPTION OF THE INVENTION

Figure 1:
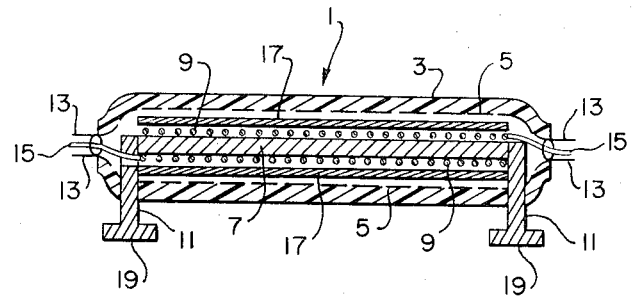
FIG. 1 shows in cross section a coaxial magnetostrictive accelerometer constructed in accordance with this invention.

FIG. 1 shows in cross section a coaxial magnetostrictive accelerometer 1 constructed in accordance with this invention. As shown in FIG. 1, accelerometer 1 comprises an inner ferrite core 7 around which is wound a wire coil 9. Coil 9 is surrounded by a separator or electrical insulator 17 which in turn is surrounded by a conductive shield 5. The entire accelerometer is then covered by a protective covering 3. The shield is brought out at each end of the accelerometer as is indicated by the numeral 13. A center conductor 15 is connected to each end of coil 9. Although not shown in FIG. 1, the shield and center conductor 15 may be connected at each end of accelerometer 1 to a standard or conventional coaxial connector. The brackets 11 are vibration sensing brackets and are bonded to ferrite core 7 at each end as shown and when the accelerometer is used, bonded or positively coupled at the other end to the source of vibration. In other words, the flat portion or feet 19 of the brackets 11 are bonded or positively coupled to the source of vibration when accelerometer 1 is put in use.

As has been mentioned above, the coaxial magnetostrictive accelerometer of FIG. 1 can be so designed that the shield 5 is placed around the coil 9 in accordance with the formula $C = L/Z^2$ so that the coil follows the laws of a slow transmission line having a characteristic impedance $Z$, a unit inductance $L$, and a unit capacitance C, so that $Z = \sqrt{L/C}$. If a plurality of accelerometers so designed are connected in series with a coaxial cable whose impedance equals the impedance of the accelerometer, there will be no appreciable attentuation of the magnetostrictive induced signals in one of the accelerometers. Such an array is shown in FIG. 2.

Figure 2:
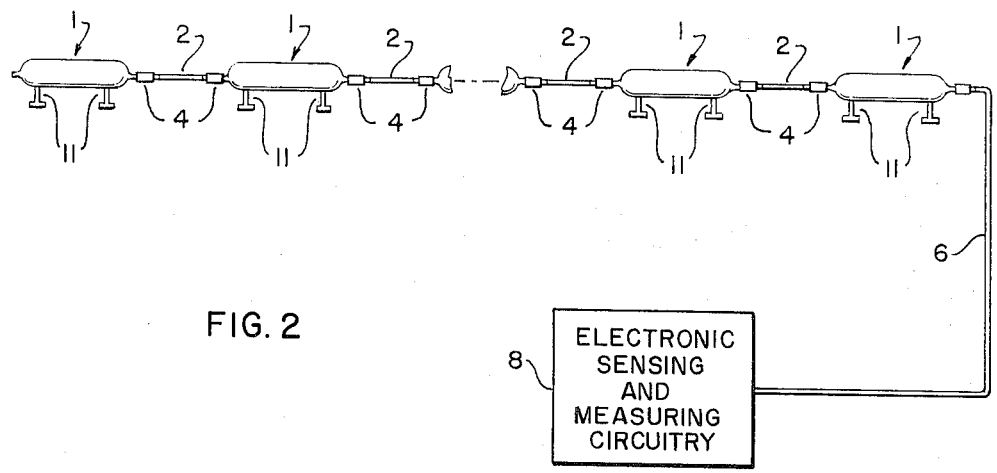
FIG. 2 shows a plurality of accelerometers of the type shown in FIG. 1 connected in a series array with single channel electronic sensing and measuring circuitry.

In FIG. 2 a plurality of accelerometers 1 are connected in series by means of the coaxial cable sections 2. Coaxial cable sections 2 are connected to the accelerometers by means of the connectors 4. Connectors 4 may be conventional coaxial type connectors. While only a small number of accelerometers are shown connected in series in FIG. 2, a hundred or more accelerometers 1 can be connected in series without appreciable signal attenuation. As shown in FIG. 2, the last accelerometer 1 in the series is coupled to the electronic sensing and measuring circuitry 8 by means of a coaxial cable 6. Electronic sensing and measuring circuitry 8 is conventional single channel electronic circuitry.

While single coaxial magnetostrictive accelerometers of this invention used alone with appropriate sensing and measuring equipment have a plurality of varied application, the unique ability to connect a large number of these accelerometers in series enables one to conduct multi-point vibration or acceleration sensing with but single channel electronic sensing and measuring circuitry. In addition, such a series array of the coaxial magnetostrictive accelerometers of this invention may contain accelerometers of different sensitivities to suit the acceleration criteria of the particular point under test. Such an array of accelerometers having different sensitivities is especially suited in alarm application where it is desired to monitor vibrations of many points inexpensively. Such measurements can be made inexpensively because the accelerometers of this invention may be manufactured very cheaply.

While the structural details of the accelerometer of this invention has been described with reference to a specific embodiment, it will be apparent to those skilled in the art that various changes and modifications can be made to the embodiment disclosed without departing from the spirit and scope of the invention as set forth in the appended claims.

What is claimed is:

1. A coaxial magnetostrictive accelerometer comprising
   an elongated ferrite core having a selected axis;
   a coil wound on said ferrite core, said coil having a common axis with said selected axis of said core;
   an electrically insulating separator wrapped around said coil;
   an electrically conductive shield wrapped around said separator such that said conductive shield is electrically insulated from said coil;
   a protective covering surrounding said conductive shield;
   vibration conductive brackets bonded to each end of said core and adapted to transmit a substantially transverse vibration to said core with respect the axis thereof;
   a pair of electrical conductors each connected to a respective end of said coil;
   and a pair of two terminal coaxial cable connectors each associated with a respective end of said accelerometer with respective terminals of each coaxial cable connector electrically connected one to said shield and the other to the respective electrical conductor at said respective end of said accelerometer.

2. A coaxial magnetostrictive accelerometer as defined in claim 1 wherein said vibration conductive brackets have a substantially T-shaped configuration with the base of the leg portion of said T-shaped configuration bonded to said ferrite core and the length of said leg portion such that the cross bar portion of said T-shaped configuration is disposed beyond said protective covering.

* * * * *